United States Patent [19]
Brownscombe et al.

[11] Patent Number: 5,252,619
[45] Date of Patent: Oct. 12, 1993

[54] PROCESS FOR PREPARING LOW DENSITY POROUS CROSSLINKED POLYMERIC MATERIALS

[75] Inventors: Thomas F. Brownscombe; Ronald M. Bass, both of Houston, Tex.

[73] Assignee: Shell Oil Company, Houston, Tex.

[21] Appl. No.: 17,544

[22] Filed: Feb. 16, 1993

Related U.S. Application Data

[62] Division of Ser. No. 891,322, May 29, 1992, Pat. No. 5,189,070.

[51] Int. Cl.⁵ ............................................. C08J 9/28
[52] U.S. Cl. ...................................... 521/64; 521/62; 521/63; 521/146; 521/149
[58] Field of Search ............... 521/64, 63, 62, 146, 521/150, 149

[56] References Cited

U.S. PATENT DOCUMENTS

| | | |
|---|---|---|
| 4,522,953 | 6/1985 | Barby et al. |
| 4,668,709 | 5/1987 | Jones et al. |
| 4,788,225 | 11/1988 | Edwards et al. |
| 5,037,859 | 8/1991 | Williams et al. |
| 5,149,720 | 9/1992 | DesMarais et al. |
| 5,189,070 | 2/1993 | Brownscombe et al. ............ 521/64 |

OTHER PUBLICATIONS

Winter, H. H., Can the Gel Point of a Cross-Linking Polymer Be Detected by the G'-G" Crossover?; Polymer Eng. And Sci., Dec. 1987, vol. 27, No. 22.

Encyclopedia of Polymer Science and Engineering, Supplement Volume, Second Edition, Copyright 1989; John Wiley & Sons, Inc., pp. 343-351.

*Primary Examiner*—Morton Foelak

[57] ABSTRACT

In a process for the preparation of a low density porous crosslinked polymeric material by polymerizing a water-in-oil high internal phase emulsion, curing time of the monomers in the emulsion can be reduced without adversely affecting polymer properties or substantially affecting the emulsion by carrying out the curing in multiple-stages. The emulsion is first pre-cured at a temperature less than about 65° C. until the emulsion reaches a Rheometrics dynamic shear modulus of at least about 500 and subsequently curing at a temperature above about 70° C.

13 Claims, 1 Drawing Sheet

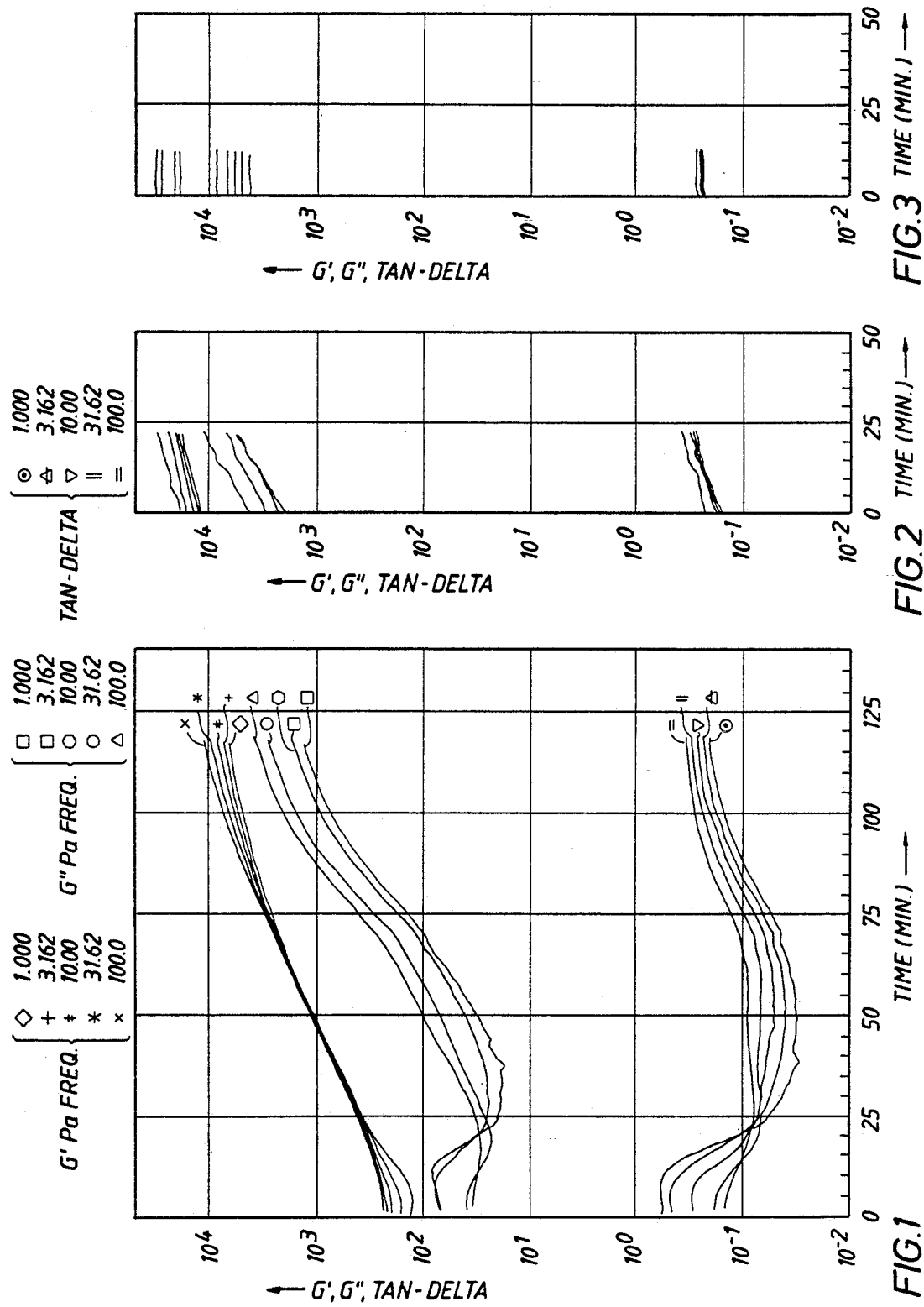

PROCESS FOR PREPARING LOW DENSITY POROUS CROSSLINKED POLYMERIC MATERIALS

This is a division of application Ser. No. 891,322, filed May 29, 1992, now U.S. Pat. No. 5,189,070.

FIELD OF INVENTION

This invention relates to the preparation of low density, porous, crosslinked, polymeric materials. In one aspect, the invention relates to reducing curing time in a high internal phase emulsion polymerization process to manufacture low density porous crosslinked polymeric materials.

BACKGROUND OF THE INVENTION

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase. Further, other properties such as good wicking and good retention of liquid under load (i.e., low compressive strain or resistance to compression deflection) are also desirable for use as an absorbent.

Typically, these high absorption capacity, low density foams are prepared by forming a high internal phase water-in-oil emulsion in the presence of a surfactant and polymerizing the monomers in the oil phase of the emulsion with a polymerization initiator at a temperature around 60° C. for about 8 hours. However, it has been found that in order to obtain foams with better properties, curing must be conducted for 16 hours or longer at a temperature of 60° C. Further, to produce these foams in a continuous process, it is desirable to heat the emulsion rapidly and to reduce the curing time. Therefore, it will be advantageous to reduce the curing time and to heat the emulsion rapidly without significantly affecting the resulting foam properties.

However, it has been found that by raising the temperature rapidly above about 65° C., the emulsion deteriorates thereby affecting the resulting foam products. Therefore, it will be desirable to be able to rapidly heat the emulsions and/or reduce the curing time without degrading the water-in-oil emulsion and adversely affecting the foam product properties.

It is therefore an object of the present invention to provide a process to prepare low density, porous crosslinked polymeric foams with improved absorption properties. It is another object of the present invention to provide a process to reduce curing time and/or to allow rapid heating without substantially degrading the water-in-oil emulsion.

SUMMARY OF THE INVENTION

According to the invention, a process for the production of a porous crosslinked polymeric material is provided, comprising the steps of:

(a) providing a water-in-oil high internal phase emulsion comprising i) a mixture of polymerizable monomers comprising at least one vinyl monomer and a difunctional unsaturated crosslinking monomer, ii) at least 90 weight percent, based on the emulsion, of water as the internal phase iii) a surfactant, and iv) a polymerization catalyst;

(b) subjecting the water-in-oil high internal phase emulsion to a temperature within the range of about room temperature to less than about 65° C. for a time effective to form a gel having a rheometrics dynamic shear modulus value of at least about 500 pascal; and (c) heating the gel at a temperature of at least about 70° C. for a time effective to cure the monomers. The process provides low density, open-cell foams having good absorption properties such as adsorption capacity and/or resistance to compression deflection property in shorter curing times.

BRIEF DESCRIPTION OF THE DRAWINGS

FIG. 1 is a graph of a Rheometrics dynamic modulus plot measured at 60° C. against time of a water-in-oil high internal phase emulsion having a water to oil ratio of 30:1 and monomer ratio of styrene to divinyl benzene to 2-ethylhexyl acrylate of 1:1:3.

FIG. 2 is a graph of a Rheometrics dynamic modulus plot measured at 60° C. against time of a wet foam having a water to oil ratio of 30:1 and monomer ratio of styrene to divinyl benzene to 2-ethylhexyl acrylate of 1:1:3.

FIG. 3 is a graph of a Rheometrics dynamic modulus plot measured at 60° C. against time of a dry foam having a water to oil ratio of 30:1 and monomer ratio of styrene to divinyl benzene to 2-ethylhexyl acrylate of 1:1:3.

DETAILED DESCRIPTION OF THE INVENTION

According to the invention, a low density porous crosslinked polymeric material (hereinafter "foam") having high absorption capacity and good wicking and resistance to compression properties can be prepared without substantially increasing curing time by curing the monomers in a water-in-oil high internal phase emulsion in multiple-stages (i.e., at least 2 stages). These foams generally have a dry density of less than about 0.1 g/cc.

Various monomers may be used in the preparation of the foams, provided the monomers can be dispersed in or form an oil phase of a water-in-oil high internal phase emulsion and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; and mixtures thereof.

Suitable crosslinking agents can be any difunctional unsaturated monomers capable of reacting with the vinyl monomers. Difunctional unsaturated crosslinking monomers include, for example, divinyl benzene, diethylene glycol dimethacrylate, 3-butylene dimethacrylate, and allyl methacrylate. Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable polymerization catalysts can be water-soluble or oil-soluble. Water-soluble catalysts include, for example, potassium or sodium persulfate and various redox systems such as ammonium persulfate together with sodium metabisulfite. Oil soluble (monomer soluble) catalysts include, for example, azodibisisobutyronitrile (AIBN), benzoyl peroxide and di-2-ethyl-hexyl-peroxydicarbonate. The catalyst should be present in an effective amount to cure the monomers. Typically the catalyst can be present from about 0.005 to about 15 weight percent based on the monomers. The polymerization catalyst can be in the water phase and polymerization occurring after transfer of the catalyst into the oil phase or an activated monomer/catalyst reaction product can be added to the oil phase. Alternatively, the polymerization catalyst may be introduced directly into the oil phase. Preferably, the polymerization catalyst is added in the water phase and polymerized after transfer of the catalyst into the oil phase for ease of handling.

The surfactant used in making the high internal phase emulsion which is to be polymerized is also important in forming a water-in-oil high internal phase emulsion. Suitable surfactants include, for example, nonionic surfactants such as sorbitan esters (eg., sorbitan monooleate and sorbitan monolaurate), glycerol esters (eg. glycerol monooleate and glycerol monoricinoleate), PEG 200 dioleate, partial fatty acid esters of polyglycerol, and caster oil 5-10 EO; cationic surfactants such as ammonium salts (eg., distearyl dimethyl ammonium chloride and dioleyl dimethyl ammonium chloride); and anionic surfactants such as bis-tridecyl sulfosuccinic acid salt. Commercially available surfactants include, for example, SPAN ® emulsifying agents 20, 40, 60, 65, 80 and 85 (from Fluka Chemical Corp.), and ALKAMULS ® sorbitan esters SML, SMO, SMS, STO and ALKAMULS ® sorbitan ester ethoxylates PMSL-20 and PSMO-20 (from Alkaril Chemicals Ltd.) among others. The amount of surfactant must be such that a water-in-oil high internal phase emulsion will form. Generally, the surfactant is present in an amount effective to form a water-in-oil high internal phase emulsion. Preferably, the surfactant can be present from about 2 to about 40% by weight, more preferably about 5 to about 25% by weight based on the monomers.

The relative amounts of the water and oil phases used to form the high internal phase emulsion are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal water phase can preferably contain a water-soluble electrolyte to stabilize the HIPE and to make the foam more water wettable. Suitable electrolyte includes inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. Unless all of these factors are such that it favors formation of a water-in-oil emulsion, the emulsion will form a oil-in-water emulsion rather than water-in-oil high internal phase emulsion. The formation of a water-in-oil emulsion is described in U.S. Pat. No. 4,522,953, the disclosure of which is herein incorporated by reference.

In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about 5 s$^{-1}$, preferably at least about 10 s$^{-1}$ can be used to mix the water-in-oil emulsion. A pin gap mixer with a shear rate of at least about 50 s$^{-1}$, preferably at least about 100 s$^{-1}$ is preferred. If the shear rate is too low, the water-in-oil emulsion will revert to a oil-in-water emulsion. It is desirable to at least have a water to oil ratio of about 9:1, preferably at least about 19:1, more preferably at least about 30:1 for a high absorbency capacity foam.

Stability of the high internal phase emulsion is important so the emulsion will not degrade during the curing process. It has been found that when some of the nonionic surfactants were used, the emulsion degraded, forming bulk oil and water phases, when the curing temperature was raised above about 65° C. For example, more than approximately 75% of the water-in-oil HIPE degraded when a HIPE containing styrene, 2-ethylhexyl acrylate and divinyl benzene monomers was rapidly cured by placing in a hot water bath at a temperature of 80° C. using a sorbitan monooleate (SPAN ® 80 emulsifying surfactant. Some of these nonionic surfactants, for example, sorbitan fatty acid esters such as sorbitan monolaurate, are desirable because of their low odor.

In order to cure the monomers faster and at higher temperature without substantially degrading the water-in-oil HIPE, the emulsion is pre-cured at a temperature of less than about 65° C. until the emulsion has a Rheometrics dynamic shear modulus of greater than about 500 pascal, preferably greater than about 800 pascal, most preferably greater than about 1000 pascal. Typically, the pre-cured emulsion will be lightly gelled, having a consistency like a jelly or a gelatin referred to as "gel".

In an alternative method, this consistency (gel) can also be tested visually by a weight resistance test. In a weight resistance test, a probe is placed on the surface of an emulsion or a gel, exerting a pressure of 0.3 psi across a cross-sectional diameter of 6 mm, penetrates less than about 6 mm, preferably less than about 3 mm in depth.

In the first curing stage the monomers are pre-cured at a temperature of less than 65° C. for a time sufficient to produce a rheometrics dynamic mechanical shear modulus of greater than about 500 pascal, generally, pre-cured for at least about 30 minutes. Subsequently, the pre-cured materials are cured at a temperature of above about 70° C., preferably above about 75° C., more preferably above about 85° C. for a time effective to cure the monomers. The cure can be as high as about 175° C. under suitable pressure to prevent water from boiling. The emulsions can be heated by hot water, hot air or steam. Preferably, the HIPE should be pre-cured for at least about one hour at 60° C. or at least about 2 hours at room temperature. Subsequently, the monomers are cured at a temperature of greater than about 70° C. generally for at least about one hour. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

Prior to the gel stage, the emulsions generally degrade with increasing temperature thereby releasing water from the internal phase resulting in unabsorbed water. Degradation of the emulsion, gel or foam can be seen by free, unabsorbed water standing on the emulsion, gel, or foam surface (or form a pool of water). Preferably, the emulsion should degrade less than 5 weight percent of water, more preferably less than 3 weight percent of water, based on total water used to prepare the emulsion.

The pre-curing and curing can be done in multiple steps as long as the temperature of the pre-curing stage is less than about 65° C. until the rheometrics dynamic shear modulus is at least about 500 pascal and curing stage reaches a temperature greater than about 70° C. for a sufficient time to obtain good properties which is typically at least one hour. For example, a ramping pre-curing/curing schedule can be preformed starting at room temperature and raising the temperature gradually in a number of steps up to about 60° C., (i.e., the HIPE is heated below about 65° C. at least until the gel reaches a rheometrics dynamic shear modulus of at least about 500 pascal) then further raising the temperature to past 70° C. until the monomers are cured. Preferably, the temperature is raised past 75 ° C., more preferably past 85 ° C.

The degree of necessary gelling (crosslinking) varies depending on the severity of the curing temperature. For example, when the gel is cured at a temperature of 75° C., the emulsion will be stable as long as the HIPE is pre-cured to a rheometrics dynamic shear modulus of at least 500 pascal. When the gel is cured at a temperature of 134° C. at a pressure of about 28 psi, a Rheometrics dynamic shear modulus of at least 800 pascal must be reached.

Alternatively, when the gel is cured at a temperature of 134° C., an emulsion must be pre-cured until the probe used in the weight resistance test preferably penetrates the resulting gel less than about 3mm, which requires pre-curing for at least about 1 hour at 60° C. For example, a foam with a good absorbance capacity can be obtained by pre-curing at a temperature of 60° C. for 4 hours and then curing at a temperature of 134° C. and pressure of about 28 psi for 4 hours.

These foams can be post-cured to improve the foam properties. Better properties such as, for example, thin thickness after drying (i.e., thickness of a foam after removing water), increased free swell (i.e., amount of liquid a foam can initially absorb), and/or good resistance to compression deflection can be obtained depending on the monomer formulation by post-curing the foam at a temperature of above about 75° C., preferably greater than 90° C., more preferably above about 95° C., most preferably at least about the boiling point of water by steam, hot air or other heating source. Such heating may be performed initially in a heat exchanger, oven, over heated rollers or by other means.

When the temperature is near or above the boiling point of water, pressure is preferably applied to keep the water in the liquid phase and to obtain better properties. If desired, the pressure may be lowered to boil some of the water, but in normal practice the water will be maintained in the liquid state to stabilize the monomer :aqueous interface and retain the foam structure, at least until the foam is gelled (i.e., pre-cured), and preferably until it is cured. Once the curing and/or post-curing process is completed, the water incorporated in the foam may be flashed by lowering the pressure to a suitable level to evaporate the remaining liquid to give the desired degree of dryness in the product foam. Such vacuum drying will preferably be used after the desired state of cure is developed in the foam material. The use of pressure to maintain the aqueous phase in the liquid state allows very rapid curing of emulsions at very high temperatures, provided the emulsions are stable at the high temperatures used. The inventive process provides a way to stabilize the emulsion so the foam can be processed at a higher temperature.

Pressure can be applied to the emulsion, if desired, at a pressure generally from above atmospheric pressure, typically within the range of about atmospheric pressure to about 150 psig. When the temperature is about 100° C., a pressure from about 1 to about 10 psig is sufficient; when the temperature is about 130° C., a pressure from about 30 psig to about 70 psig is preferred. The preferred pressures will be from just above the autogenous steam pressure of the solution to about twice that pressure on an absolute pressure basis, i.e., psia; higher or lower pressures may be used as desired to achieve specific results. For example, if the vapor pressure of the monomer mixture exceeds that of water, a pressure sufficient to prevent volatilization of either water or monomer will be used. The minimum preferred pressure will be that sufficient to prevent volatilization. In general, pressures above such value will be preferred to provide some margin of safety. Most preferred will be pressures of from above the vapor pressure of the emulsion to about twice the vapor pressure of the emulsion, although higher pressures may be used if convenient. In general, the cost of pressure equipment will be greater as the pressure is increased, resulting in the preferred range having an upper limit of about twice the minimum necessary pressure for economic reasons.

One method to cure an emulsion under pressure is to use an autoclave operating under autogenous pressure of steam generated from pure water at a given temperature. This method will prevent volatilization of the aqueous salt solution in the emulsion. Another satisfactory method is to use applied nitrogen or air pressure to prevent boiling of the emulsion. In case a permanent gas is used, an inert gas such as nitrogen or argon will be preferred over air or oxygen from a flammability point of view. The pressure may also be maintained by mechanical means, such as rollers, pistons, molds, or the like. This method will be particularly useful if continuous processing is desired.

These foams prepared by the inventive process may be washed and dried to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can generally be dried by squeezing the water and/or solvent out of the foams and air or heat drying. The foams produced by the inventive process possess high absorption capacities and good free swell values, especially suitable for use in liquid absorbent articles such as wipes, diapers and catamenial products for example.

ILLUSTRATIVE EMBODIMENT

The following illustrative embodiments describe the process of the invention and are provided for illustrative purposes and are not meant as limiting the invention.

WASHING AND DRYING METHOD

The following washing and drying method was used for all of the examples below: After the foam blocks were cured, the blocks were sliced to 0.35 inches (0.89 cm) thickness. Then, each individual slice was placed on a 0.04 inch (0.1 cm) mesh screen between a 9"×6.75" (22.9 cm×17.1 cm) stainless steel plate that allowed the slice to be squeezed to a 0.045 inch (1.14 mm) thickness. The squeezed slices were placed in an ARBOR-press made by DAKE and the calcium chloride solution was squeezed out. The slices were then washed and squeezed twice by soaking the slices in 2 gallons of 1% calcium chloride solution and placing in the ANVIL-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Rheometrics Dynamic Modulus

The measurements on the emulsion were made on a Rheometrics RDS-7000 series mechanical spectrometer (any oscillatory dynamic tester which is capable of testing liquids in a couette fixture can be used) using a couette fixture, consisting of a cylindrical bob which rotates centered in a concentric cup (the bob has a conical end mating with a conical bottom on the cup). The samples were put into the cup after oil-wetting and drying the cup and the cup was placed so that the bob displaced the emulsion. The clearance between the bob and cup was about 2 mm and the total sample was less than 7 cc. A small amount of a low-volatility mineral oil TUFFLO® 6056 (a hydrogenated mineral oil) was floated on top of the emulsion in the small annulus formed surrounding the bob. The measurements were made at high shear strain (typically 20%) at 4 discrete frequencies (0.1, 1, 10 and 100 radian/sec.) as a function of time after loading the cup. The sample was vibrated rotationally (dynamic mode) and the torque, rpm and normal force were recorded. The Rheometrics dynamic functions, G', shear modulus, G", loss modulus and tangent delta and ratio of G" to G' were measured. These data were plotted as a function of elapsed time.

Similar moduli were measured in the solid state between parallel plates having a diameter of 1.3 inches (3.3 cm) using a sample thickness of about 0.2 inches (0.5 cm) instead of the cup for the wet final cured foam and final cured foam which has been dried. Comparison of these similar moduli, measured in the solid state for the wet final cured foam and final cured foam gives a relative indication of the progress of the cure state to completion based on the development of modulus. The technique of tracking of the dynamic moduli as a function of time at a temperature can be found in Encyclopedia of Polymer Science & Engineering, 1989, "Gel Point" by Heening Winter; and H. H. Winter, Polymer Engineering and Science, V27 #22, p1698 (1987).

Data of a high internal phase water-in-oil emulsion having a water to oil ratio of 30:1 and a monomer ratio of styrene to divinyl benzene to 2-ethylhexyl acrylate of 20:20:60 was measured at 60° C. and plotted in FIG. 1 (wet emulsion), FIG. 2 (wet foam) and FIG. 3 (dry foam). The emulsion was formed in a similar manner to Example 2 below with 20% surfactant (SPAN® 80 to SPAN® 85 ratio of 2:1) and 0.15% potassium persulfate. Water phase was added at 0.4 lb/min. The emulsification temperature was 40° C. and the pin mill was spinning at 2400 RPM. The foam was cured for 24 hours at 60° C. prior to the wet foam and dry foam measurement.

Weight Resistance Test

A flat-tipped probe of about 6 mm diameter was placed on top of an emulsion or gel to create a pressure at the flat-tip of about 0.3 psi. The ease and penetration of the object into the gel was measured. The emulsion is gelled when the object no longer penetrates or penetrates less than about 3 mm.

Free swell/Dry Thickness/swollen Thickness/Foam Density/Percent Strain/Resistance to Compression Deflection/Swell Ratio A 2"×2" (5.08×5.08 cm) square is cut from a foam slice. The thickness of the foam sample is measured while it is dry ("dry thickness") using a dead weight thickness gage (a digital linear gage model EG-225 made by Ono Sokki) exerting 50 grams force applied to a 1.60" diameter disk. This thickness is called the "caliper." The foam square is soaked in warm 88° F (31° C.) Syn-Urine from Jayco for 17 minutes. From the 2"×2" (5.08×5.08 cm) square, a Circle of 1.129" (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 0.74 psi stress where stress is the total dead weight applied to the gage divided by the cross-sectional area. The thickness of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60°-70° C. and dried until the foam has fully expanded. The remnant from the square sample is used for TOLUENE-SWELL test described below. The weight of the dry disk sample is then determined in grams ("final dry weight").

The following values were calculated from the above measurements.

Free swell = initial wet weight/final dry weight
Resistance to Compression Deflection (RTCD) = wet weight after load at 15 minutes/final dry weight
Swell Ratio = RTCD/Free swell × 100

$$\% \text{ Strain} = \frac{\text{initial wet caliper} - \text{wet caliper}}{\text{initial wet caliper}} \times 100$$

Foam Volume $(cm^3)$ = $(diameter/2)^2 \times 3.142 \times$ initial wet caliper
based on a 1.129" diameter circle cut (in cm)
Foam Density $(mg/cm^3)$ = final dry weight × 1000/Foam Volume

Toluene Swell and Molecular Weight Between Crosslinks (MWBC)

The sample which was used for the Free-Swell procedure is used. The newly cut sample, washed of inorganic impurities, is weighed to obtain the initial sample weight. It is then placed on top of about 50 ml of methanol in a glass jar. The sample is allowed to soak up methanol; if air pockets are observed the sample is gently squeezed to expel air. After 24 hours at room temperature the samples are removed, quickly blotted and immediately weighed wet ("wet methanol weight"). The samples are gently squeezed to expel the methanol and then dried in a vacuum oven for at least three hours at 60° C., then cooled, and weighed ("methanol dried weight"). The samples are then placed on top of about 50 ml of toluene in bottles and allowed to absorb and swell for 24 hours at room temperature. The samples are then removed, quickly blotted and immediately weighed ("toluene swollen weight"). The samples are then gently squeezed to dispel the toluene without breaking the foam and then dried in a vacuum oven at 60° C. for 24 hours, and then weighed. This is a final "toluene dried weight." volume of methanol in pores:

$$= \frac{(\text{Wet Methanol Weight} - \text{Methanol dried Weight})}{(\text{Density of Methanol})}$$

volume of toluene absorbed = vol in the pores + vol in the polymer:

$$= \frac{(\text{Wet Toluene Weight} - \text{Toluene dried Weight})}{(\text{Density of Toluene})}$$

volume of polymer:

$$= \frac{\text{Toluene dried Weight .OR. Methanol dried Weight}}{(\text{Density of Polymer})[\text{assumed:} = 1.0]}$$

mg/cc Absolute Foam Density:

$$= \frac{\text{Toluene dried Weight .OR. Methanol dried Weight}}{\text{Volume of methanol in pores} + \text{Volume of polymer}} \times 1000$$

Toluene Swell Ratio:

$$= \frac{\text{Volume of Polymer} + \text{Volume of toluene absorbed}}{\text{Volume of Polymer} + \text{Volume of methanol in pores}}$$

Molecular Weight Between Crosslinks (MWBC)(g/mole or Daltons):

$$= 10^{(2.358 - \frac{\log(1/TOLUENE\ SWELL\ RATIO)}{0.7156})}$$

Vertical Wicking Rate

From a foam slice, cut at 0.35 inches (0.89 cm) thickness, a 1 to 2 cm wide strip is cut, greater than 5 cm in length. The strip of foam is clamped or taped to a meal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1 mm). The Syn-Urine is dyed with food coloring to more easily monitor its absorption and rise in the foam. A stopwatch is used to measure the time required for the liquid level to reach 5 cm vertical height in the foam sample.

Percent Free Liquid

The amount of unabsorbed water was measured by decanting fluid from the foam in the container after pre-curing or curing stage and weighing the decanted fluid.

EXAMPLE 1

This example demonstrates preparation of a low density crosslinked polymeric material according to the invention under rapid heating conditions. For comparison, this example also demonstrates that high internal phase water-in-oil emulsions tend to break when rapidly heated.

In a 4 oz. glass jar, emulsions with aqueous phase to monomers ratio as listed below were made with the monomers containing 20% styrene, 20% of a commercial 55% divinyl benzene (from Aldrich Chemical Co.) and 60% of 2-ethyl hexyl acrylate with an addition of 12 parts of a sorbitan monolaurate (SPAN ® 20 emulsifying agent from Fluka Chemical Corp. Aldrich Chemical Co.) for Series A and Series C or sorbitan monooleate (SPAN ® 80 emulsifying agent from Fluka Chemical Corp.) for Series B as surfactants for every 100 parts of monomers. The combined monomers were emulsified with 10% $CaCl_2$ solution for Series A and Series B and with 1.1% $CaCl_2$ solution for Series C in deionized water containing 0.15% potassium persulfate as a curing agent. The following results were obtained when the emulsion was formed at 40° C. and the bottles were then immediately placed into thermostatted water baths at temperatures listed below. All runs were heated until a probe used in the weight resistance test penetrated less than 3 mm unless otherwise indicated in Table 1 as libed below. Percent Free liquid of the heat treated emulsions (cured) is shown below.

TABLE 1

| | | | | | | | | | |
|---|---|---|---|---|---|---|---|---|---|
| Series A: | | | | | | | | | |
| Ratio | | | | 30:1 | | | | | |
| *Pre-Curing* | | | | | | | | | |
| Temperature °C. | 60 | 60 | 60 | 60 | — | — | — | — | |
| Time hr | 1 | 1 | 2 | 2 | — | — | — | — | |
| *Curing* | | | | | | | | | |
| Temperature °C. | 80 | 100 | 80 | 100 | 60 | 60 | 100 | 100 | |
| Time hr | 2 | 2 | 1 | 1 | 1 | 3 | 1 | 2 | |
| % Free Liquid | 24 | 60 | 2.6 | 5.5 | 2 | 2 | 72 | 72 | |
| Ratio | | 40:1 | | | | | | | |
| *Pre-Curing* | | | | | | | | | |
| Temperature °C. | 60 | 60 | 60 | 60 | | | | | |
| Time hr | 0.5 | 1 | 2 | 3 | | | | | |
| *Curing* | | | | | | | | | |
| Temperature °C. | 100 | 100 | 100 | 100 | | | | | |
| Time hr | 3 | 2.5 | 1 | 1 | | | | | |
| % Free Liquid | 46 | 65 | 26 | 9 | | | | | |
| Ratio | | 20:1 | | | 30:1 | | | 40:1 | |
| *Curing* | | | | | | | | | |
| Temperature °C. | 60 | 80 | 100 | 60 | 80 | 100 | 60 | 80 | 90 |
| % Free Liquid | 1 | 2 | 3 | 1 | 5 | 10 | 15 | 65 | 90 |
| Series B: | | | | | | | | | |
| Temperature °C. | 60 | 80 | 100 | 60 | 80 | 100 | 60 | 80 | 100 |
| % Free Liquid | 50 | 95 | 100 | 30 | 80 | 100 | 100 | 100 | 100 |
| @ 60° C. oven | 48.4 | | | 64.5 | | | 100 | | |
| Series C: | | | | | | | | | |
| Temperature | | | | | | | | | |
| % Free Liquid | | | | 4 | 35 | 60 | | | |

The percent free liquid indicates the amount of emulsion breakage by the time curing of the material was stoped. As can be seen from the results in Series A, B and C, rapid warming to high temperature is responsible for the loss of emulsion. For example, 40:1 material of Series A may be cured in a 32 oz. batch in an air oven set at 60° C. with loss of less than 5% of the emulsion: in a 4 oz. batch in water bath set at 60 ° C. or higher large amounts of emulsion is lost. This example demonstrates that the stability of the emulsion is poor as the cure temperature is increased. The instability of the emulsion is increased as the temperature is raised to 80° C., and further to 100° C.

As can be seen from Table 1, Series A, a precure of at least about 2 hours at 60° C. may be necessary to give a low free liquid value when the foam is rapidly heated to 100° C. in a water bath at a 30:1 water to oil ratio. At the higher 40:1 water to oil ratio, the emulsion is more delicate, and a longer time of at least about 3 hours at 60° C. may be required to maintain full absorbancy in the cured material. As can be seen from the differences in % Free Water at a given temperature depending on the water to oil ratio, the surfactant used and concentration of the electrolyte in Table 1, a particular time of precure must be optimized to each system. As can be seen from Table 1, Series A, a suitable precure time may be found to largely eliminate the emulsion instability observed when the emulsion is heated rapidly to high temperatures.

EXAMPLE 2

This example demonstrates preparation of a low density crosslinked polymeric material according to the invention. Table 2 below describes the amount of the monomer components and surfactant used in the process. Runs 2a, 2c, 2e, 2g and 2i are comparative examples.

An Edge Sweets pin mill mixing machine incorporating a 1 hp motor belt driving a 6" long 1¼" diameter pin mill with 12 layers of pins on the central rotor, 0.02" clearance between rotor and barrel, and fitted with flow meters and thermocouples for monitoring, was used to form the high internal phase water-in-oil emulsions. Oil phase (monomers and surfactants) were metered and controlled by a model 184-56C magnetic drive pump made by Micropump Corporation. Water phase flow was controlled by a similar pump of greater capacity (model 120-56C made by Micropump Corp.). The maximum oil flow in the configuration is 0.04 lbs/min; the maximum water phase (water, salt and potassium persulfate initiator) flow is 1.20 lbs/min. Control based on flow rates and/or pump RPM is provided by software in an Eaton IDT FACTORY MATE control computer and an Allen-Brodley PLC-5 programmable logic controller.

A 10 gallon tank fitted with an air motor stirrer was used to mix aqueous internal phase. The oil phase was externally mixed by shaking or with a stirrer bar. The water phase was fed directly from mixing tank by the pump. The oil pump reservoir is a 1 liter steel tank.

In a typical run procedure, the pin mill is mounted and filled with oil phase. The flow of water and oil is started with the pin mill spinning typically at 2000 RPM. Typical conditions to establish emulsions are a water to oil feed ratio of 2:1 to 10:1 (i.e , low water to oil ratio), temperatures at mix heads of 25° C. to 65° C., feed rates of oil and water of 0.05 to 0.50 lbs/min, pin mill rotation rates of 1500 to 3000 RPM, emulsion flow rates of 0.3 to 1.2 lb/min, pin mill length of 6" to 18" and pin/barrel clearance of 0.05 to 0.02". Flow rate, pin mill length, pin/barrel clearance, RPM and temperature are adjusted to give the smoothest emulsions with most uniform back-pressure through the pin mill.

Following establishment of a smooth emulsion at low water to oil ratio, the ratio was raised to the desired value as shown in Table 2 by increasing the water flow and/or decreasing the oil flow. Changes are preferably made smoothly, with adjustment of all the above factors to give optimum emulsion quality.

The emulsion was let out of the pin mill mix-head through a static mixer to complete emulsion homogenation. After the desired emulsion conditions are reached, the emulsion was collected in 6 lb sample containers at a flow rate of 0.3 to 1.20 lb/min and cured in an oven at a temperature and time shown in Table 2.

When sweating of the emulsion occured during increasing the water to oil ratio, the flow rate was adjusted upward, RPM adjusted, and the water to oil ratio was further increased until operation stabilizes at a uniform back-pressure with greater homogeneity. At this point, the emulsion is normally stabilized in a structure which will persist with low back-pressure throughout variations of the water to oil ratio and flow rates to desired levels.

Properties of these polymeric products are shown in Table 3 below.

TABLE 2

| RUN NO. | 2a | 2b | 2c | 2d | 2e | 2f | 2g | 2h | 2i** | 2j** |
|---|---|---|---|---|---|---|---|---|---|---|
| Oil phase | | | | | | | | | | |
| styrene (g) | — | — | 600.3 | 600.3 | 600.3 | 600.3 | 600.3 | 600.3 | — | — |
| divinyl benzene* (g) | 1092.0 | 1092.0 | 600.1 | 600.1 | 600.1 | 600.1 | 600.1 | 600.1 | 729.6 | 729.6 |
| 2-EH acrylate (g) | 1635.5 | 1635.5 | 1806.3 | 1806.3 | 1806.3 | 1806.3 | 1806.3 | 1806.3 | 1096.0 | 1096.0 |
| SPAN ® 20 (G) | 325.96 | 325.96 | 359.5 | 359.5 | 359.5 | 359.5 | 359.5 | 359.5 | 330.4 | 330.4 |
| Aqueous phase | | | | | | | | | | |
| K Persulfate (g) | 56.86 | 56.86 | 56.8 | 56.8 | 56.8 | 56.8 | 56.8 | 56.8 | 56.8 | 56.8 |
| $CaCl_2$ (g) | 3788 | 3788 | 3788 | 3788 | 3788 | 3788 | 3788 | 3788 | 3788 | 3788 |
| Water (g) | 34,092 | 34,092 | 34,088 | 34,088 | 34,088 | 34,088 | 34,088 | 34,088 | 34,088 | 34,088 |
| Water:Oil Ratio | 30:1 | 30:1 | 30:1 | 30:1 | 45:1 | 45:1 | 40:1 | 40:1 | 55:1 | 55:1 |
| Emulsification Temp. (°C.) | 42 | 42 | 49 | 49 | 52 | 52 | 49 | 51 | 51 | 50 |
| RPM | 3000 | 3000 | 3000 | 3000 | 3200 | 3200 | 3000 | 3000 | 2500 | 2500 |
| Aqueous Flow Rate (lb/min) | 0.68 | 0.68 | 1.16 | 1.16 | 0.83 | 0.83 | 1.17 | 0.83 | 0.49 | 0.50 |
| Oil Flow Rate (lb/min) | 0.022 | 0.022 | 0.04 | 0.04 | 0.02 | 0.02 | 0.029 | 0.02 | 0.009 | 0.009 |
| Pre-curing: | | | | | | | | | | |
| Temperature (°C.) | — | 60 | — | 60 | — | 60 | — | 60 | — | 60 |
| Time (hrs) | — | 16 | — | 4 | — | 4 | — | 3 | — | 1.5 |
| Curing: | | | | | | | | | | |
| Temperature (°C.) | 60 | 75 | 60 | 134 | 60 | 134 | 60 | 134 | 60 | 134 |
| Time (hrs) | 22 | 16 | 24 | 4 | 24 | 4 | 24 | 2 | 24 | 2 |

*Commercial divinyl benzene containing 55% divinyl benzene from Aldrich Chemical Co. was used unless otherwise indicated.
**Commercial divinyl benzene containing 78% divinyl benzene from Dow Chemical Co. was used.

TABLE 3

| RUN NO. | 2a | 2b | 2c | 2d | 2e | 2f | 2g | 2h | 2i | 2j |
|---|---|---|---|---|---|---|---|---|---|---|
| % Free Liquid | 3 | 3 | 2.2 | 2 | 5 | 5 | ~4 | ~4 | ~8 | ~8 |
| Toluene Swell Ratio | 1.20 | 1.06 | 1.30 | 1.35 | 1.30 | 1.23 | 1.35 | 1.38 | 0.98 | 0.86 |
| MWBC (daltons) | 2544 | 2135 | 2859 | 2994 | 2845 | 2645 | 3016 | 3101 | 1914 | 1605 |
| % Compressive Strain | 3.8 | 5.3 | 9.0 | 9.8 | 70.9 | 71.8 | 62.8 | 63.6 | 56.2 | 47.9 |
| RTCD (g/g) | 18.8 | 17.1 | 23.3 | 26.4 | 11.5 | 21.2 | 13.8 | 12.7 | 14.0 | 25.9 |
| Foam Density (mg/cm$^3$) | 32.9 | 35.5 | 34.2 | 34.3 | 23.3 | 24.1 | 26.1 | 25.7 | 19.4 | 19.6 |
| Free Swell (g/g) | 19.8 | 18.4 | 25.1 | 28.1 | 40.3 | 41.2 | 35.6 | 36.9 | 17.3 | 48.4 |
| Dried Thickness (in) | 0.362 | 0.288 | 0.096 | 0.095 | 0.066 | 0.065 | 0.065 | 0.068 | 0.333 | 0.345 |
| Swollen Thickness (in) | 0.365 | 0.283 | 0.349 | 0.367 | 0.360 | 0.355 | 0.336 | 0.364 | 0.325 | 0.359 |
| Swell Ratio | 95.0 | 92.8 | 92.6 | 94.0 | 28.5 | 51.5 | 38.8 | 34.4 | 81.1 | 53.5 |
| Vertical Wicking Rate (s) | 190 | 202 | 171 | 85 | 235 | 95 | 210 | 104 | >10 min | >10 min |

EXAMPLE 3

This example demonstrates another preparation of a low density crosslinked polymeric material according to the invention. Table 4 below describes the monomer components and surfactant used in the process. Runs 3a and 3d are comparative examples.

For runs 3a, 3b and 3c, 300 g of calcium chloride was mixed with 2700 cc of Barnstead water (water deionized to <0.4 mg sodium content by a Barnstead deionizer) to give a 1? % calcium chloride solution. Aqueous solutions were prepared by adding potassium persulfate in the amount listed in Table 4 to 600 cc, 900 cc or 900 cc of the calcium chloride solution for runs 3a, 3b and 3c, respectively, at a temperature of approximately 40° C. A monomer mixture was prepared by mixing together 722.3 g of divinyl benzene (commercial divinyl benzene containing 55% divinyl benzene from Aldrich Chemical Co.), 1656.3 g of 2-ethylhexyl acrylate and 288.8 g of SPAN ® 20 (sorbitan monolaurate from Fluka Chemical Corp.). The aqueous solution was slowly added to a 1 liter plastic bottle containing the monomer mixture in the amount listed in Table 4. The contents of the beaker were constantly stirred with a paint stirrer (model 06200 PM-70 made by SHUR-LINE ® Inc.) attached to an air motor (#C-1712 ¼ hp motor made by Arrow Engineering Co.) during the addition. After all of the aqueous solution Was added, the mixture was stirred about 1 minute more to insure all the aqueous solution was fully mixed in. The foam was then poured into a 1.25 quart stainless steel square pan and covered with a stainless steel lid. The pan was placed in an oven and/or an hospital autoclave (9000-D rapid exhaust Autoclave made by NAPCO set at 134° C. and approx. 28 psi) at a temperature and for a time listed in Table 4. Properties of these polymeric products are shown in Table 5.

For runs 3d and 3e, 300 g of calcium chloride was mixed with 2700 cc of Barnstead water to give a 10% calcium chloride solution. Aqueous solutions were prepared by adding potassium persulfate in the amount listed in Table 4 to 600 cc or 900 cc of the solution for runs 3d and 3e, respectively, at a temperature of approximately 40° C. A monomer mixture was prepared by mixing together 276.9 g of styrene, 821.1 g of divinyl benzene, 1635.2 g of 2-ethylhexyl acrylate and 330.2 g of SPAN ® 20. The aqueous solution was slowly added to a 1 liter plastic bottle containing the monomer mixture in the amount listed in Table 4 in a similar manner to runs 3a, 3b and 3c. The foam was then poured into a 1.25 quart stainless steel square pan and covered with a stainless steel lid. The pan was placed in an oven and/or an hospital autoclave (the NAPCO Autoclave) at a temperature and for a time listed in Table 4. Properties of these polymeric products are shown in Table 5.

TABLE 4

| RUN NO. | 3a | 3b | 3c | 3d | 3e |
|---|---|---|---|---|---|
| Monomer Mixture (g) | 20.29 | 30.21 | 30.35 | 20.5 | 30.64 |
| Aqueous solution (cc) | 600 | 900 | 900 | 600 | 900 |
| Water:Oil Ratio | 30:1 | 30:1 | 30:1 | 29:1 | 29:1 |
| Potassium Persulfate (g) | 0.90 | 1.39 | 1.37 | 0.92 | 1.34 |
| Pre-curing: | | | | | |
| Temp. (°C.) | — | 60 | 60 | — | 60 |
| Time (hrs) | — | 1 | 4.33 | — | 4 |
| Curing: | | | | | |
| Temp. (°C.) | 60 | 134 | 134 | 60 | 134 |
| Time (hrs) | 24 | 3.75 | 4 | 22.5 | 4 |

TABLE 5

| RUN NO. | 3a | 3b | 3c | 3d | 3e |
|---|---|---|---|---|---|
| % Free Liquid | 4 | 5 | 3 | 3 | 4 |
| Toluene Swell Ratio | 1.21 | 1.24 | 1.23 | 1.25 | 1.18 |
| MWBC (Daltons) | 2574 | 2659 | 2631 | 2687 | 2484 |
| % Compressive Strain | 3.4 | 31.6 | 4.6 | 3.0 | 4.8 |
| RTCD (g/g) | 19.5 | 24.0 | 25.4 | 22.7 | 22.7 |
| Foam Density (mg/cm$^3$) | 32.7 | 30.8 | 32.2 | 33.2 | 35.4 |
| Free Swell (g/g) | 20.5 | 29.9 | 26.4 | 23.6 | 24.0 |
| Dried Thickness (in) | .349 | .352 | .331 | .378 | .379 |
| Swollen Thickness (in) | .349 | 0.310 | .327 | .370 | .374 |
| Swell Ratio | 94.9 | 80.2 | 96.3 | 96.2 | 94.6 |
| Vertical Wicking Rate (s) | 168 | 148 | 172 | 94 | 352 |

As can be seen from Tables 3, 5 and 7, by using the multiple-stage/higher temperature cure of the invention, in general, the foams can be cured at higher temperature, resulting in faster cure time and/or in many cases improved foam properties. Further, the gel can be cured rapidly at higher temperature by using the inventive process.

As can be seen from Table 5, the effects of the multiple-stage/higher temperature cure is formulation dependent. For example, free swell and RTCD are raised when cured at 134 ° C. as can be seen from runs 3b and 3c compared to 3a. In general, RTCD is about equal or higher when the foam is cured or post-cured at 134 ° C. as can be seen from both Tables 3 and 5, thus, improving absorption properties of the foams. In some formulations, vertical wicking rate of water is faster (shown by shorter time in Vertical Wicking Rate in Table 3) than foams cured at 60 ° C., as can be seen from runs 2d, 2f and 2h. These properties are particularly improved when the foams are cured at higher temperature of above about 91° C., preferably above about 95° C., more preferably at least about the boiling point of water, without substantial change in the crosslink density as can be seen by the close crosslink density values.

EXAMPLE 4

This example demonstrates another preparation of a low density crosslinked polymeric material according to the invention. Runs 4a and 4d are comparative examples. The following runs were prepared in a similar manner to Example 2 with an Edge Sweets pin mill mixing machine with parameters as listed in Table 6. A ramped temperature program was used for Example 4c and 4f. The emulsion of Example 4c and 4f were cured by raising the temperature from ambient temperature at a rate of 3° C./minute, then holding the temperature at 60° C. for 1 hour. Then, the temperature was raised at a rate of 1° C./minute until it reached 90° C. Subsequently the gel was cured at a temperature of 90° C. for 2 hours. The properties of the polymeric foam products are shown in Table 7.

As seen from Table 7, foams with comparable properties can be obtained with higher temperatures and shorter cure times.

TABLE 6

| RUN NO. | 4a | 4b | 4c | 4d | 4e | 4f |
|---|---|---|---|---|---|---|
| Oil phase | | | | | | |
| styrene (g) | 200.0 | 200.0 | 200.0 | 200.0 | 200.0 | 200.0 |
| divinyl benzene* (g) | 200.0 | 200.0 | 200.0 | 200.0 | 200.0 | 200.0 |
| 2-EH acrylate (g) | 600.0 | 600.0 | 600.0 | 600.0 | 600.0 | 600.0 |
| SPAN ® 20 (g) | 120.0 | 120.0 | 120.0 | 120.0 | 120.0 | 120.0 |
| Aqueous phase | | | | | | |
| K Persulfate (g) | 44.24 | 44.24 | 44.24 | 44.24 | 44.24 | 44.24 |
| CaCl$_2$ (g) | 2946 | 2946 | 2946 | 2946 | 2946 | 2946 |
| Water (g) | 26521 | 26521 | 26521 | 26521 | 26521 | 26521 |
| Water:Oil Ratio | 30:1 | 30:1 | 30:1 | 35:1 | 35:1 | 35:1 |
| Emulsification Temp. (°C.) | 45 | 48 | 44 | 49 | 48 | 46 |
| RPM | 2000 | 2000 | 3003 | 2500 | 2500 | 3003 |
| Aqueous Flow Rate (lb/min) | 1.161 | 1.161 | 1.161 | 1.66 | 1.66 | 1.166 |
| Oil Flow Rate (lb/min) | 0.038 | 0.038 | 0.038 | 0.033 | 0.033 | 0.033 |
| Pre-curing: | | | | | | |
| Temperature (°C.) | — | 60 | ramped | — | 40/90 | ramped |
| Time (hrs) | — | 1 | ** | — | ** | |
| Curing: | | | | | | |
| Temperature (°C.) | 60 | 90 | ramped | 60 | 90 | ramped |

TABLE 6-continued

| RUN NO. | 4a | 4b | 4c | 4d | 4e | 4f |
|---|---|---|---|---|---|---|
| Time (hrs) | 24 | 3 | | 24 | 3.5 | |

*Commercial divinyl benzene containing 55% divinyl benzene from Aldrich Chemical Co.
**time taken from 40° C. (sample temperature) to reach 90° C. oven temperature.

TABLE 7

| RUN NO. | 4a | 4b | 4c | 4d | 4e | 4f |
|---|---|---|---|---|---|---|
| % Compressive Strain | 10 | 16 | 15 | 27 | 24 | 67 |
| RTCD (g/g) | 19 | 23 | 23 | 21 | 22 | 11 |
| Foam Density (mg/ml) | 35 | 38 | 36 | 31 | 31 | 27 |
| Free Swell (g/g) | 21 | 25 | 26 | 28 | 27 | 34 |
| Dried Thickness (in) | 0.186 | 0.094 | 0.095 | 0.096 | 0.090 | 0.059 |
| Vertical Wicking Rate (s) | 205 | 90 | 97 | 116 | 142 | 190 |

EXAMPLE 5

This example demonstrates the effect of time/temperature profile depending on the rate of heat transfer. The stability of the emulsion will depend not only on the temperature to which it is heated, but also on the rate of heating. A time/temperature profile which will allow an emulsion to be heated as rapidly as possible to a temperature at which cure can be quickly completed, without breaking the emulsion should be determined.

As shown in Table 1, the stability of the emulsion to heating depends on both the temperature of the water bath and the details of the emulsion composition including, for example, water to oil ratio and surfactant used. In addition, the stability can be affected by rate of heating as can be seen from Table 8.

In a 4 oz. glass jar or 3 pint polyethylene tub, emulsions with aqueous phase to monomers ratio as listed below were made with the monomers containing 20% styrene, 20% of a commercial 55% divinyl benzene (from Aldrich Chemical Co.) and 60% of 2-ethyl hexyl acrylate with an addition of 12 parts of a sorbitan monolaurate (SPAN® 20 emulsifying agent from Fluka Chemical Corp.) as surfactants for every 100 parts of monomers. The combined monomers were emulsified with 10% $CaCl_2$ solution in deionized water containing 0.15% potassium persulfate as a curing agent. The following % Free Liquids were obtained when the emulsion was formed at 40° C. and the bottles or tubs were then immediately placed into thermostatted water baths or in ovens for as indicated at temperatures listed below. Glass bottles were heated for 45 minutes and the tubs were heated for 22 hour at 60° C. or at 100° C. Percent Free liquid of the cured emulsions is shown in Table 8. The emulsions in both the 4 oz. bottle and 3 pint tub were also placed in the heating devices at 30.0° C. and the temperature of the emulsion was measured at a point 2 cm from the wall of the containers at various times after placing the emulsions into the heating devies as listed in Table 8 below.

As can be seen from Table 8, the rate of heating at a given depth in the air oven is lower than at the same depth in the water bath. This rate will also be controlled by the sample size and geometry, as well as the nature of the container and source of heat. For example, after 9 minutes, the emulsion at the center of a 4 oz glass bottle in a 100° C. water bath is 95° C., while the emulsion at the center of a 3 pint tub in a 100° C. oven after the same time is 30.5° C.

In selecting the correct precure, cure and/or postcure conditions in the inventive process, temperature and heat transfer rates must be chosen such that the foam will survive the precure time in a gelled and not broken condition, with sufficent stability (as addressed in the discussions of the weight resistance and Rhometrics shear modulus tests) to withstand the high temperature postcure. As may be seen from the examples presented and discussed in the specification, this may be done in many ways. The temperature, rate of change of temperature, and time at temperature in the emulsion must be controled in a way which generates the desired level of precure without breaking the emulsion.

We claim:

1. A process for the preparation of a porous crosslinked polymeric material comprising:
   (a) providing a water-in-oil high internal phase emulsion comprising i) a mixture of polymerizable monomers comprising at least one vinyl monomer and from about 2 to about 70 weight percent, based on the mixture, of a difunctional unsaturated crosslinking monomer, ii) at least 90 weight percent, based on the emulsion, of water as the internal phase iii) an effective amount of a surfactant to form a water-in-oil high internal phase emulsion, and iv) an effective amount of a polymerization catalyst to cure the polymerizable monomers; and
   (b) subjecting the water-in-oil high internal phase emulsion to a temperature of greater than 90° C. and a pressure within the range of from about atmospheric pressure to about 150 psig for a time

TABLE 8

| Curing Method: | Waterbath, 4 oz. bottle | | | | Oven, 3 pint tub | |
|---|---|---|---|---|---|---|
| Water to oil Ratio: | 30:1 | | 40:1 | | 30:1 | |
| Curing Temperature °C.: | 60° C. | 100° C. | 60° C. | 100° C | 60° C | 100° C. |
| % Free Liquid | 2 | 72 | 15 | 90 | 4 | 6 |
| Temperature at point 2 cm from wall of container, at various times after placing emulsion into oven or water bath: | | | | | | |
| 5 minutes: | 37 | 90 | | | 32 | 32 |
| 10 minutes: | 50 | 97 | | | 34 | 34 |
| 20 minutes: | 58 | 100 | | | 42 | 44 |
| 40 minutes: | 60 | 100 | | | 47 | 59 | sufficient to cure the monomers and to produce a porous crosslinked polymeric material having less than about 5% of free monomers.

2. The process of claim 1 in which the water-in-oil high internal phase emulsion is heated at a temperature of above about 95° C.

3. The process of claim 1 in which the water-in-oil high internal phase emulsion is heated under a pressure of at least above atmospheric pressure.

4. The process of claim 2 in which the pressure is within the range from just above the autogenous steam pressure of the internal phase or the mixture of polymerizable monomers to about twice the autogenous steam pressure on an absolute pressure basis.

5. The process of claim 2 in which the pressure is within the range from above the vapor pressure of the water-in-oil high internal phase emulsion to about twice the vapor pressure of the water-in-oil high internal phase emulsion.

6. The process of claim 5 in which the water-in-oil high internal phase emulsion further comprises an electrolyte.

7. The process of claim 6 in which the vinyl monomer is selected from the group consisting of monoalkenyl arenes, acrylate or methacrylate esters and mixtures thereof.

8. The process of claim 7 in which the difunctional unsaturated crosslinking monomer is selected from the group consisting of divinyl benzene, diethylene glycol dimethacrylate, 3-butylene dimethacrylate and allyl methacrylate.

9. A process for the preparation of a porous crosslinked polymeric material comprising:
   (a) providing a water-in-oil high internal phase emulsion comprising i) a mixture of polymerizable monomers comprising at least one vinyl monomer and from about 2 to about 70 weight percent, based on the mixture, of a difunctional unsaturated crosslinking monomer, ii) at least 90 weight percent, based on the emulsion, of water as the internal phase iii) an effective amount of a surfactant to form a water-in-oil high internal phase emulsion, and iv) an effective amount of a polymerization catalyst to cure the polymerizable monomers; and
   (b) subjecting the water-in-oil high internal phase emulsion to a temperature of near or above the boiling point of water and a pressure within the range of from about atmospheric pressure to about 150 psig for a time sufficient to cure the monomers and to produce a porous crosslinked polymeric material having less than about 5% of free monomers.

10. The process of claim 9 in which the pressure is within the range from above the vapor pressure of the water-in-oil high internal phase emulsion to about twice the vapor pressure of the water-in-oil high internal phase emulsion.

11. The process of claim 9 in which the water-in-oil high internal phase emulsion further comprises an electrolyte.

12. The process of claim 11 in which the vinyl monomer is selected from the group consisting of monoalkenyl arenes, acrylate or methacrylate esters and mixtures thereof.

13. The process of claim 12 in which the difunctional unsaturated crosslinking monomer is selected from the group consisting of divinyl benzene, diethylene glycol dimethacrylate, 3-butylene dimethacrylate and allyl methacrylate.

* * * * *